US008959912B2

(12) United States Patent
Hoess et al.

(10) Patent No.: US 8,959,912 B2
(45) Date of Patent: Feb. 24, 2015

(54) VEHICLE COMPRISING A CHARGED COMBUSTION ENGINE AND METHOD FOR OPERATING A VEHICLE COMPRISING A CHARGED COMBUSTION ENGINE

(75) Inventors: Bernhard Hoess, Munich (DE); Jens Neumann, Poing (DE); Armin Engstle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 79 days.

(21) Appl. No.: 13/356,095

(22) Filed: Jan. 23, 2012

(65) Prior Publication Data
US 2012/0137681 A1 Jun. 7, 2012

Related U.S. Application Data

(63) Continuation of application No. PCT/EP2010/059040, filed on Jun. 25, 2010.

(30) Foreign Application Priority Data

Jul. 24, 2009 (DE) .......................... 10 2009 034 510

(51) Int. Cl.
*F02B 33/44* (2006.01)
*F02B 39/10* (2006.01)
(Continued)

(52) U.S. Cl.
CPC . *F02B 39/10* (2013.01); *B60K 6/48* (2013.01); *B60W 20/00* (2013.01); *F02B 33/34* (2013.01);
(Continued)

(58) Field of Classification Search
CPC .......... B60K 6/48; B60W 20/00; F02B 33/34; F02B 37/013; F02B 37/04; F02B 37/10; F02B 37/127; F02B 39/04; F02B 39/10; F02B 39/12; B60Y 2400/435; Y02T 10/6221; Y02T 10/144
USPC ......... 60/607, 608; 180/65.25–65.26, 65.265; 123/559.1, 565; 903/902, 930, 906, 903/946; 290/40 A, 52
See application file for complete search history.

(56) References Cited

U.S. PATENT DOCUMENTS 2,503,289 A * 4/1950 Nettel ............................ 290/4 D
2,585,029 A * 2/1952 Nettel .............................. 60/606
(Continued)

FOREIGN PATENT DOCUMENTS

DE 2 353 724 5/1974
DE 28 40 375 A1 4/1980
(Continued)

OTHER PUBLICATIONS

German Office Action dated Jun. 25, 2010 including English-language translation (Nine (9) pages).
(Continued)

*Primary Examiner* — Kenneth Bomberg
*Assistant Examiner* — Jason T Newton
(74) *Attorney, Agent, or Firm* — Crowell & Moring LLP (57) ABSTRACT

A vehicle includes an internal-combustion engine for driving a drive train of the vehicle, at least one charger for increasing the pressure of the air supplied to the internal-combustion engine and an electrical machine which can be or is coupled to the charger in a torque-transmitting manner and is provided for driving or supporting the drive of the charger. The drive train can be or is coupled with the electrical machine in a torque-transmitting manner.

18 Claims, 6 Drawing Sheets

(51) Int. Cl.
*B60K 6/48* (2007.10)
*B60W 20/00* (2006.01)
*F02B 33/34* (2006.01)
*F02B 37/013* (2006.01)
*F02B 37/04* (2006.01)
*F02B 37/10* (2006.01)
*F02B 37/12* (2006.01)
*F02B 39/04* (2006.01)
*F02B 39/12* (2006.01)

(52) U.S. Cl.
CPC ............... *F02B 37/013* (2013.01); *F02B 37/04* (2013.01); *F02B 37/10* (2013.01); *F02B 37/127* (2013.01); *F02B 39/04* (2013.01); *F02B 39/12* (2013.01); *Y02T 10/6221* (2013.01); *Y02T 10/144* (2013.01); *B60Y 2400/435* (2013.01); *B60K 2006/4825* (2013.01)
USPC ............ 60/607; 123/565; 123/559.1; 60/608; 180/65.21

(56) References Cited

U.S. PATENT DOCUMENTS

| | | | | |
|---|---|---|---|---|
| 2,654,991 | A * | 10/1953 | Nettel | 60/606 |
| 4,233,815 | A | 11/1980 | Melchior | |
| 4,312,183 | A | 1/1982 | Regar | |
| 4,958,708 | A * | 9/1990 | Kawamura | 60/608 |
| 5,105,624 | A * | 4/1992 | Kawamura | 60/608 |
| 5,406,797 | A * | 4/1995 | Kawamura | 60/608 |
| 5,729,978 | A | 3/1998 | Hiereth et al. | |
| 6,378,308 | B1 * | 4/2002 | Pfluger | 60/612 |
| 6,840,045 | B2 * | 1/2005 | Kusase | 60/702 |
| 6,871,499 | B1 * | 3/2005 | Allen et al. | 60/608 |
| 7,765,805 | B2 * | 8/2010 | Lofgren | 60/608 |
| 8,143,732 | B2 * | 3/2012 | Algrain | 290/1 A |
| 8,397,501 | B2 * | 3/2013 | Barker | 60/608 |
| 2002/0117860 | A1 * | 8/2002 | Man et al. | 290/46 |
| 2008/0210480 | A1 * | 9/2008 | Kraxner | 180/65.2 |
| 2009/0025696 | A1 * | 1/2009 | Lovgren | 123/559.1 |
| 2009/0048745 | A1 * | 2/2009 | Wu et al. | 701/51 |
| 2011/0138808 | A1 * | 6/2011 | Lofgren | 60/607 |

FOREIGN PATENT DOCUMENTS

| | | | |
|---|---|---|---|
| DE | 689 02 799 T2 | 1/1993 | |
| DE | 42 12 984 A1 | 11/1993 | |
| DE | 42 03 528 C2 | 6/1995 | |
| DE | 44 29 855 C1 | 8/1995 | |
| DE | 100 52 555 A1 | 5/2002 | |
| DE | 10 2004 029 828 A1 | 1/2006 | |
| DE | 10 2006 034 825 A1 | 2/2007 | |
| DE | 10 2006 059 664 A1 | 7/2007 | |
| DE | 10 2006 045 937 A1 | 4/2008 | |
| DE | 10 2006 053 037 A1 | 5/2008 | |
| DE | 10 2007 057 224 A1 | 1/2009 | |
| GB | 2 390 871 A | 1/2004 | |
| WO | WO 0032917 A1 * | 6/2000 | F02B 39/10 |
| WO | WO 2005/124121 A1 | 12/2005 | |
| WO | WO 2008/020184 A1 | 2/2008 | |
| WO | WO 2008/075130 A1 | 6/2008 | |
| WO | WO 2008075127 A1 * | 6/2008 | F02B 41/10 |
| WO | WO 2009/014488 A2 | 1/2009 | |

OTHER PUBLICATIONS

International Search Report dated Dec. 27, 2010 including English-language translation (Six (6) pages).

* cited by examiner

VEHICLE COMPRISING A CHARGED COMBUSTION ENGINE AND METHOD FOR OPERATING A VEHICLE COMPRISING A CHARGED COMBUSTION ENGINE

CROSS-REFERENCE TO RELATED APPLICATIONS

This application is a continuation of PCT International Application No. PCT/EP2010/059040, filed Jun. 25, 2010, which claims priority under 35 U.S.C. §119 from German Patent Application No. DE 10 2009 034 510.8, filed Jul. 24, 2009, the entire disclosures of which are herein expressly incorporated by reference.

BACKGROUND AND SUMMARY OF THE INVENTION

The present invention relates to a vehicle comprising an internal-combustion engine provided for driving a drive train of the vehicle, at least one charger provided for increasing the pressure of the air supplied to the internal-combustion engine, and an electrical machine which can be or is coupled to the charger in a torque-transmitting manner and is provided for driving or supporting the drive of the charger, as well as to a method of operating same.

Nowadays, vehicle drives, particularly of passenger vehicles, are usually designed such that steady-state power demands (constant driving) and quasi steady-state power demands (constant driving at low acceleration) as well as non-steady-state power demands (driving at higher acceleration to maximal acceleration), are covered by the drive. As a rule, the non-steady-state power demands have a considerably lower time increment than the steady-state or quasi steady-state power demands. Therefore, a considerable "over-motorization" exists in most operating conditions of the vehicle.

In the case of vehicles that use internal-combustion engines as their drive, a trend toward "downsizing" the internal-combustion engines, i.e. a trend toward engines with a smaller displacement and oftentimes fewer cylinders, has been observed for some time. In order to nevertheless achieve the desired driving performances, the internal-combustion engines are charged to an increasingly higher degree. Quite predominantly, in this case, exhaust gas turbochargers (ATL) are used as chargers for charging the internal-combustion engine, i.e., for increasing the pressure of the intake air. The exhaust gas turbochargers use the enthalpy contained in the exhaust gas of the internal-combustion engine by way of a turbine compressor unit for compressing or for increasing the pressure level of the air supplied to the internal-combustion engine. However, it is known that, when accelerating from a low rotational speed range, internal-combustion engines with purely fluidically driven exhaust gas turbochargers have a time-delayed response characteristic, which is frequently referred to as "turbo lag", and has a negative effect with respect to the vehicle handling.

From German Patent document DE 10 2006 053 037 A1, an internal-combustion engine having an exhaust gas turbocharger is known, which can be driven in a boosting manner by an electrical machine, whereby the response characteristic of the engine when accelerating from the low rotational speed range is improved in comparison to conventionally charged engines.

Drive systems with electrically driven chargers are also known from DE 10 2007 057 224 A1 and DE 10 2006 034 825 A1. The technical background of the invention also includes DE 42 03 528 C2, DE 28 40 375, DE 100 52 555 A1, DE 10 2006 059 664 A1, DE 42 12 984 A1 and DE 44 29 855 C1.

Alternative approaches also take place with diverse hybrid concepts, in which the internal-combustion engine is boosted by an electrical motor, for example, when accelerating. However, an electrical boosting function will be noticeable only at relatively low speeds. At higher speeds, the electrical power demand required for a noticeable additional acceleration effect, as a rule, clearly exceeds the electric power actually installed in current vehicles. An electric power of more than 100 kW is normally required for a boosting function that is noticeable also at higher speeds. Because of the limited technical possibilities of the currently available electrical accumulator systems, an electrical drive support is therefore possible only for a relatively short time period or only with limited power.

It is an object of the invention to create a vehicle with a charged internal-combustion engine. The vehicle should be highly efficient particularly in the steady-state operation at a low to medium load and have a very good response characteristic when accelerating from the steady-state operation. A corresponding method of operating such a vehicle should also be developed.

This and other objects are achieved by a vehicle, and method of operating same, comprising an internal-combustion engine provided for driving a drive train of the vehicle, at least one charger provided for increasing the pressure of the air supplied to the internal-combustion engine, and electrical machine which can be or is coupled to the charger in a torque-transmitting manner and is provided for driving or supporting the drive of the charger. The drive train can be or is coupled with the electrical machine in a torque-transmitting manner.

The starting point of the invention is a vehicle having an internal-combustion engine, at least one "charger" and an electrical machine which can be coupled with the charger in a torque-transmitting manner and is provided for the drive or for the drive support of the charger.

The term "charger" used in the present description as well as in the claims should be interpreted very broadly; it basically comprises any "device" that can be used for increasing the pressure of the air supplied to the internal-combustion engine. The term "charger" particularly includes flow compressors, such as radial flow compressors, compressors or displacement chargers, as well as exhaust gas turbochargers. It is known that an exhaust gas turbocharger has a turbine wheel arranged in an exhaust gas flow of the internal-combustion engine, which turbine wheel drives a compressor wheel. In contrast to conventional, purely fluidically driven exhaust gas turbochargers, the compressor wheel or the turbocharger shaft can be driven in a supporting manner or purely electromotively by the electrical machine.

"Can be coupled in a torque-transmitting manner" or "coupleable in a torque-transmitting manner" in the sense of the invention means that, during some operating conditions of the vehicle, a frictional connection can be established between the electrical machine and the charger for the purpose of driving the charger.

In accordance with the invention, the drive train of the above-described vehicle can also be coupled in a torque-transmitting manner with the one electrical machine.

Here, the term "drive train" basically includes individual as well as all components transmitting propulsive power, which are arranged in the torque path between the crankshaft of the internal-combustion engine and the driving wheels of the vehicle. In accordance with the invention, the term "drive train" may also comprise the crankshaft and other connection elements which permit a direct or indirect power transmission or torque transmission to the drive train.

According to the invention, the driving power generated by the electrical machine is at least not primarily provided for feeding into the drive train, but primarily for driving the charger which, in comparison to the diverse known hybrid vehicle concepts, is significantly more efficient with respect to energy. The electric energy is therefore primarily fed indirectly into the thermodynamic combustion process.

The layout of the vehicle drive can be compared with that of a power plant process. The internal-combustion engine forming the basic drive covers the "base load; i.e., makes available the basic power required for the steady-state or quasi steady-state driving conditions (constant driving as well as constant driving with acceleration of, for example, less than 0.5 m/s$^2$). Temporarily arising peak loads are covered by way of the "basic internal-combustion engine with an electrically supported charger function" system composite.

However, according to the invention, the electrical machine cannot only be used as an electric motor for driving the charger or the drive train but, beyond that, can also be used as a generator for recuperating and converting kinetic energy from the drive train to electric energy. The electric energy obtained by means of the electrical machine during coasting and braking phases can be fed into an electrical energy accumulator, such as a battery or capacitor arrangement, and can be intermediately stored.

In operating conditions in which a high motor power is retrieved, the electric energy obtained by generating can therefore be used for operating the electrical machine and thereby for the drive or for supporting the drive of the charger. Such an electric or electrically supported charger is particularly advantageous in a situation in which the vehicle is to be rapidly accelerated from the steady-state operation. Because of the spontaneously available electric energy, an electric or electrically supported charger can be accelerated by way of the electrical machine from a low rotational speed range almost without delay to the nominal speed while, because of the time-delayed enthalpy buildup in the exhaust gas flow, a conventional exhaust gas turbocharger has a time-delayed run-up characteristic.

In addition to the described advantage that, in the case of the construction of the vehicle according to the invention, kinetic energy of the vehicle can be converted to electric energy in the form of braking energy recuperation during braking and coasting phases and can thereby be recovered, this electric energy can also be highly efficiently utilized for the acceleration buildup of the vehicle, particularly during acceleration phases. The electrically driven charger can be spontaneously run up to its nominal operating point. Furthermore, this makes it possible to further reduce the displacement of the basic engine of the internal-combustion engine while maintaining equally good or partially even improved response characteristics, which leads to a further efficiency gain of the vehicle.

The construction of the vehicle according to the invention also has the significant advantage of reduced system expenditures by utilizing one and the same electrical machine for the generator-type and motor-type operation as a function of the operating condition of the vehicle. This is possible only because the concerned operating conditions—coasting and/or braking operation, on the one hand, and acceleration or constant driving, on the other hand—never occur simultaneously.

According to a further development of the invention, (from a functional point of view) a first mechanical coupling device is provided between the electrical machine and the charger. The coupling device can assume an open condition, in which the rotor of the electrical machine is uncoupled from a drive shaft of the charger, or a closed condition, in which the electrical machine and the charger are coupled in a torque-transmitting manner.

For a coupling or uncoupling of the electrical machine with the drive train or from the drive train of the vehicle, from a functional point of view, a second coupling device may be provided "between" the electrical machine and the drive train. The second coupling device can also assume an open or a closed condition. In the open condition, the electrical machine is uncoupled from the drive train. In contrast, in the closed condition, the electrical machine is coupled with the drive train of the vehicle. In coasting and braking phases, this permits a recuperation of kinetic energy of the vehicle. Depending on the installed electric power, while the second coupling device is closed, the electrical machine can be used for maneuvering the vehicle, as a drive support for the internal-combustion engine or even for purely electric driving.

For this purpose, the drive train can be coupled with the electrical machine by way of a transmission device, such as a chain drive, a belt drive, a gear step, or the like, as well as the second coupling device.

In addition to the two above-mentioned coupling devices, a third mechanical coupling device may be provided by way of which the internal-combustion engine can be coupled or is coupled with the drive train. By "opening" the third coupling device, the internal-combustion engine can be uncoupled from the drive train, for example, in coasting or braking phases, which has a favorable effect on the recuperation efficiency. Also in operating conditions in which the driving is purely electrical, i.e. in which the drive train is driven exclusively by the above-mentioned electrical machine or another electrical machine installed in the vehicle, it is advantageous to uncouple the internal-combustion engine by opening the third clutch, which avoids engine drag losses. By means of clutch devices that can be shifted in an "optional" manner, a connection and disconnection respectively of the "generator motor" that meets the requirements becomes possible.

The mechanical coupling devices may, for example, be electrically, electromagnetically, hydraulically or otherwise triggerable or controllable clutches. Electromagnetic clutches are preferable because of their capability to react rapidly and their wear resistance. However, in principle, other devices permitting a coupling or uncoupling of torques can also be considered. Thus, the function of the two clutches can, for example, also be advantageously represented by means of a planetary gear train transmission.

The electrical machine may, for example, be an asynchronous machine or a reluctance machine. In particular, the electrical machine may be a rotational-speed-controlled machine, which has the advantage that the power of the electric machine and therefore the "charger power" can be controlled corresponding to the driving power currently demanded by the driver. As an alternative or in addition, a transmission unit that can be shifted in steps or an infinitely variable transmission device can be provided between the charger and the electrical machine.

According to a further development of the invention, a two-step or multi-step charging is provided. In this context, the at least one charger is called the "second charger". In addition to the second charger, a first charger is provided which is also provided for increasing the pressure of the air supplied to the internal-combustion engine. The first charger may be arranged "parallel" to the second charger or serially in front of the second charger. In the latter case, the second charger is a "high-pressure charger" which raises the pressure of the intake air from a first pressure level generated by the first changer to a second, higher pressure level. The first charger, which in the case of a "two-stage charging", is called a "low-pressure charger", may also be an exhaust turbocharger.

Summarizing, the following advantages, for example, are achieved by way of the invention: (1) the ability to easily represent an effective and efficient electric or electrically supporting "boost function" (drive support for the internal-combustion engine) and optimization of the response characteristic of the internal-combustion engine; (2) reduced system expenditures (number of components, costs, installation space) for representing a generator function and the electric "boost" function by multiple use of the electrical machine; (3) free scalability of the system composite; (4) energy-related optimization of the entire drive system with a considerable consumption reduction without any losses of steady-state or dynamic driving power; and ability to easily represent an E-driving function.

Other objects, advantages and novel features of the present invention will become apparent from the following detailed description of one or more preferred embodiments when considered in conjunction with the accompanying drawings.

DETAILED DESCRIPTION OF THE DRAWINGS

The abbreviation EMG used in the figures stands for "electric motor generator" and indicates the electrical machine constructed according to the invention which, in some operating conditions of the vehicle, can be operated in a generating fashion and in other operating conditions of the vehicle in a motive fashion.

Figure 1:
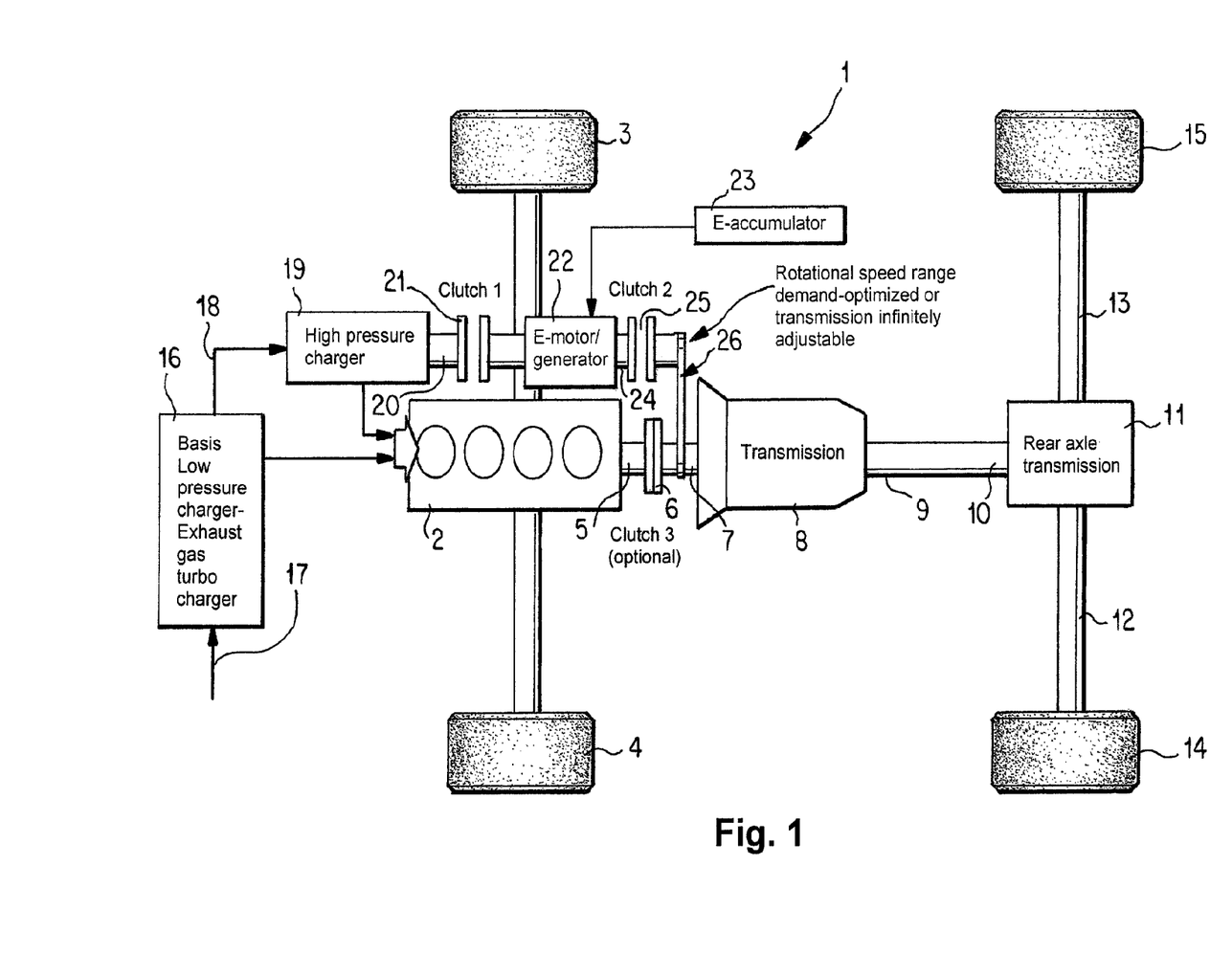
FIG. 1 is a schematic view of the basic principle of a vehicle according to the invention.

FIG. 1 is a schematic view of the drive concept of a vehicle 1 whose primary drive is formed by an internal-combustion engine 2 which, in the embodiment illustrated here, is arranged in the area of the front axle defined by the front wheels 3, 4. By way of a clutch 6, which in the following is also called a "third clutch", a crankshaft 5 of the internal-combustion engine is coupled with an input 7 of a transmission 8. An output of the transmission 8 is coupled by way of a drive shaft 9 with an input 10 of a rear axle transmission 11. The rear axle transmission 11 distributes the driving power to the rear wheels 14, 15 by way of output shafts 12, 13.

A two-stage charger arrangement is assigned to the internal-combustion engine 2. The charger arrangement has a low-pressure exhaust gas turbocharger 16 which takes in and supercharges ambient air 17. The supercharged air 18 is further compressed by a high-pressure charger 19 and is supplied to the intake line of the internal-combustion engine 2. The low-pressure exhaust gas turbocharger 16 has a turbine wheel (not shown here in detail) arranged in the exhaust gas line of the internal-combustion engine 2 and drives a compressor wheel (also not shown).

The high-pressure charger 19 may also be an exhaust gas turbocharger or a conventional flow compressor or displacement charger. A charger shaft 20 of the high-pressure charger 19 can be coupled with an electrical machine 22 by way of a clutch 21, which in the following will also be called a "first clutch". The electrical machine 22 is electrically connected with an electric energy accumulator 23, which may be a battery arrangement or a capacitor arrangement. A rotor 24 of the electrical machine can thereby be rotationally coupled with the high-pressure charger 19 by way of the first clutch 21. As an alternative or simultaneously, the rotor 24 can be coupled by way of a clutch 25, which in the following will also be called a "second clutch", as well as by way of a transmission step 26, with the "drive train", i.e. in the embodiment illustrated here, with the input shaft 7 of the transmission 8.

Figure 2:
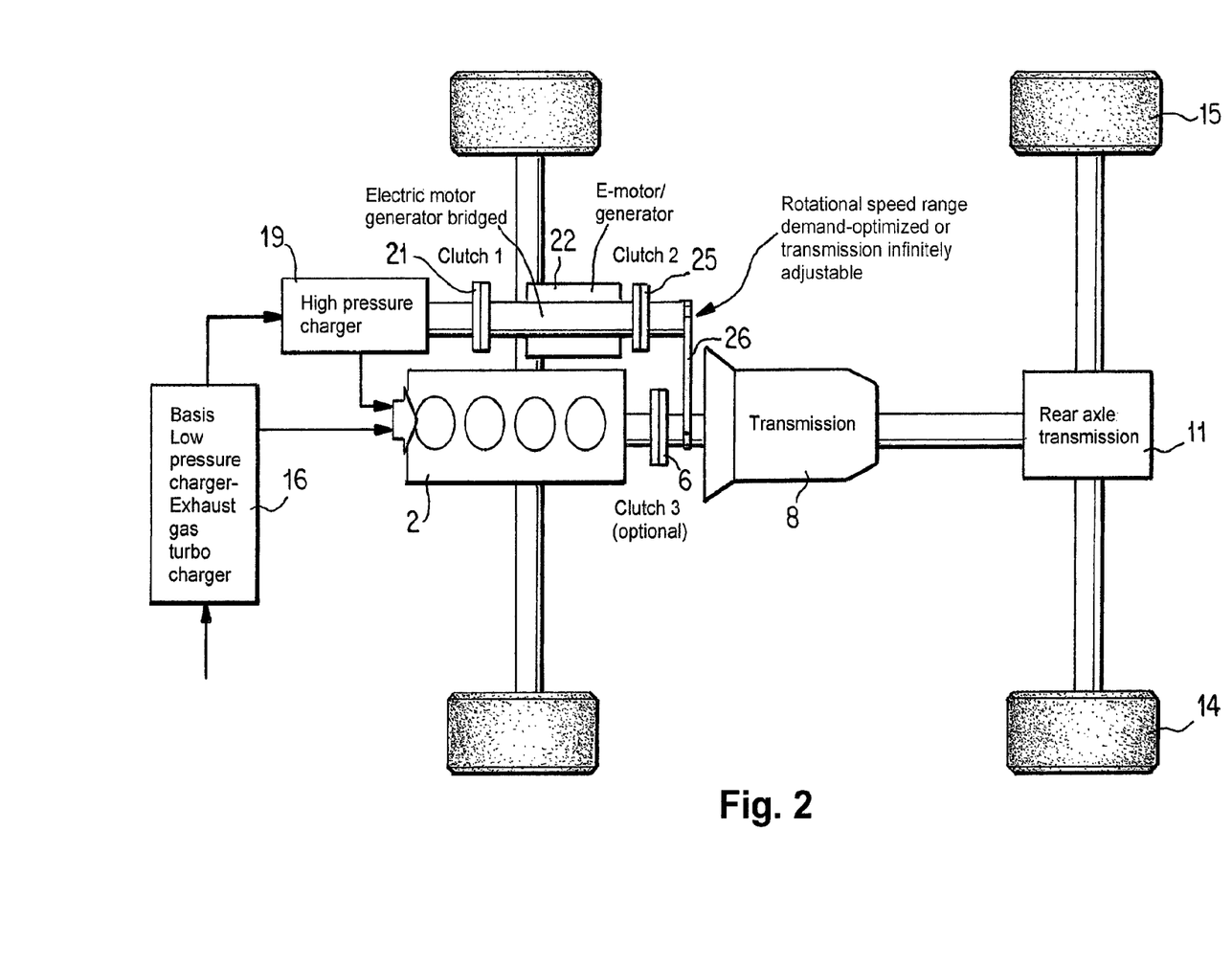
FIG. 2 is a view of the steady-state drive operating condition within the so-called low-end torque operating range.

FIG. 2 illustrates the "steady-state drive" operating condition at a high load and low rotational speed (within the low-end torque operating range). A typical situation is that of traveling on a mountain pass road. The three clutches 6, 21 and 25 are closed in this condition. In this case, the electrical machine may be "bridged", i.e. may be passive. However, as an alternative, the drive train may be also be coupled with the charger 19 by way of the electrical machine 22. By way of the third clutch 6, the transmission 8 and the rear-axle transmission 11, the torque supplied by the internal-combustion engine 2 flows to the rear wheels 14, 15. A portion of the power generated by the internal-combustion engine 2 is branched off by way of the transmission step 26 and, by way of the clutches 25 and 21, is used for the (mechanical) drive of the high-pressure charger 19. In this operating condition, the internal-combustion engine 2 is therefore charged by the exhaust gas turbocharger 16, i.e. by flow energy of the exhaust gas of the internal-internal combustion engine as well as by a portion of the mechanical power that drives the high-pressure charger 19 and is generated by the internal-combustion engine 2 itself.

Figure 3:
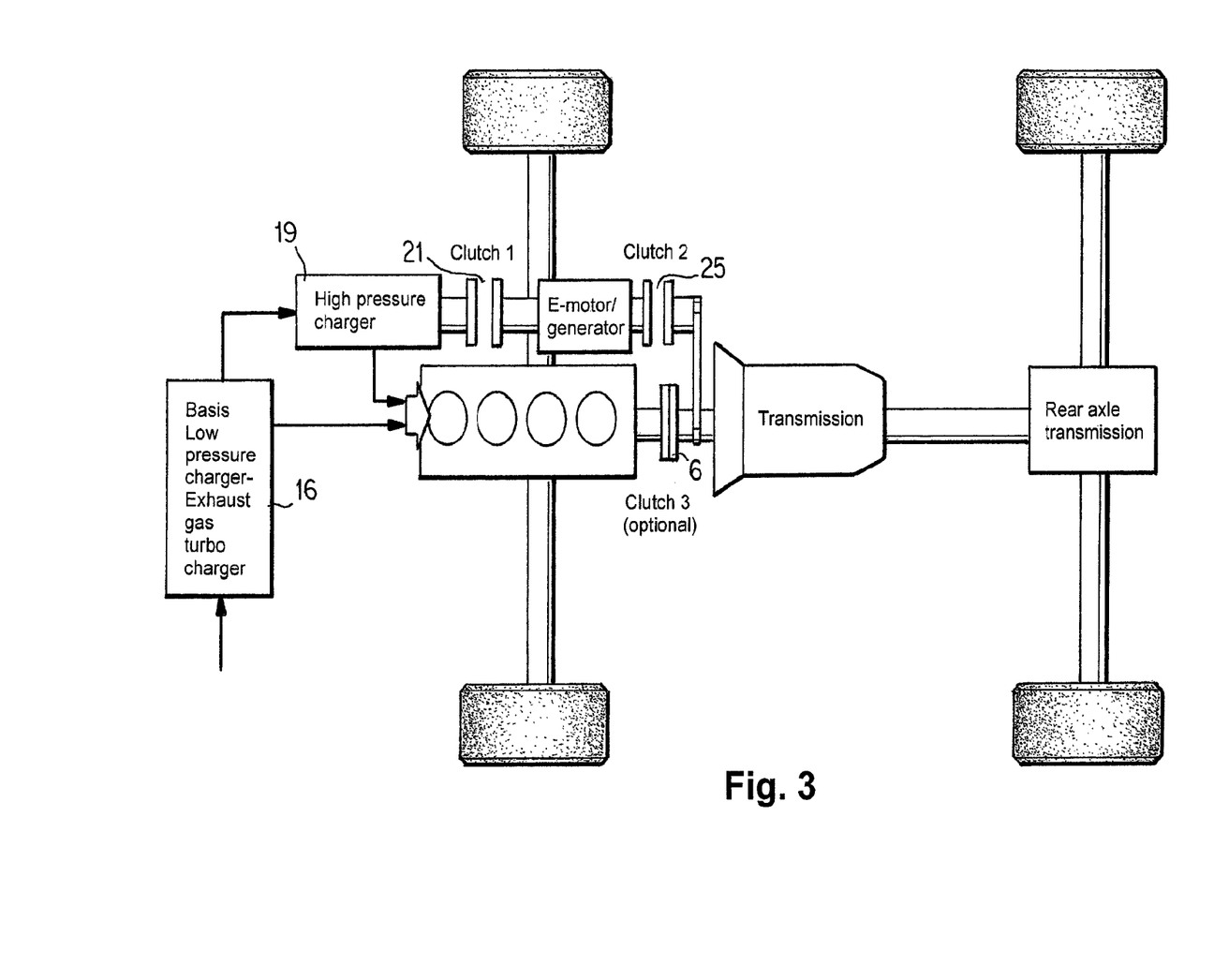
FIG. 3 is a view of the steady-state drive operating condition outside the so-called low-end torque operating range.

FIG. 3 illustrates the steady-state drive operating condition at a higher load and a higher rotational speed (steady-state drive outside the low-end torque operating range). In this operating condition, the first and the second clutch 21, 25 respectively are open. The third clutch 6 is closed. In this operating condition, the rotational speed of the internal-combustion engine is sufficiently high, so that the engine power that is demanded by the driver can already be generated just by charging the internal-combustion engine by way of the low-pressure exhaust gas turbocharger 16. In this operating condition, the high-pressure charger 19 can be passive, i.e. deactivated.

Figure 4:
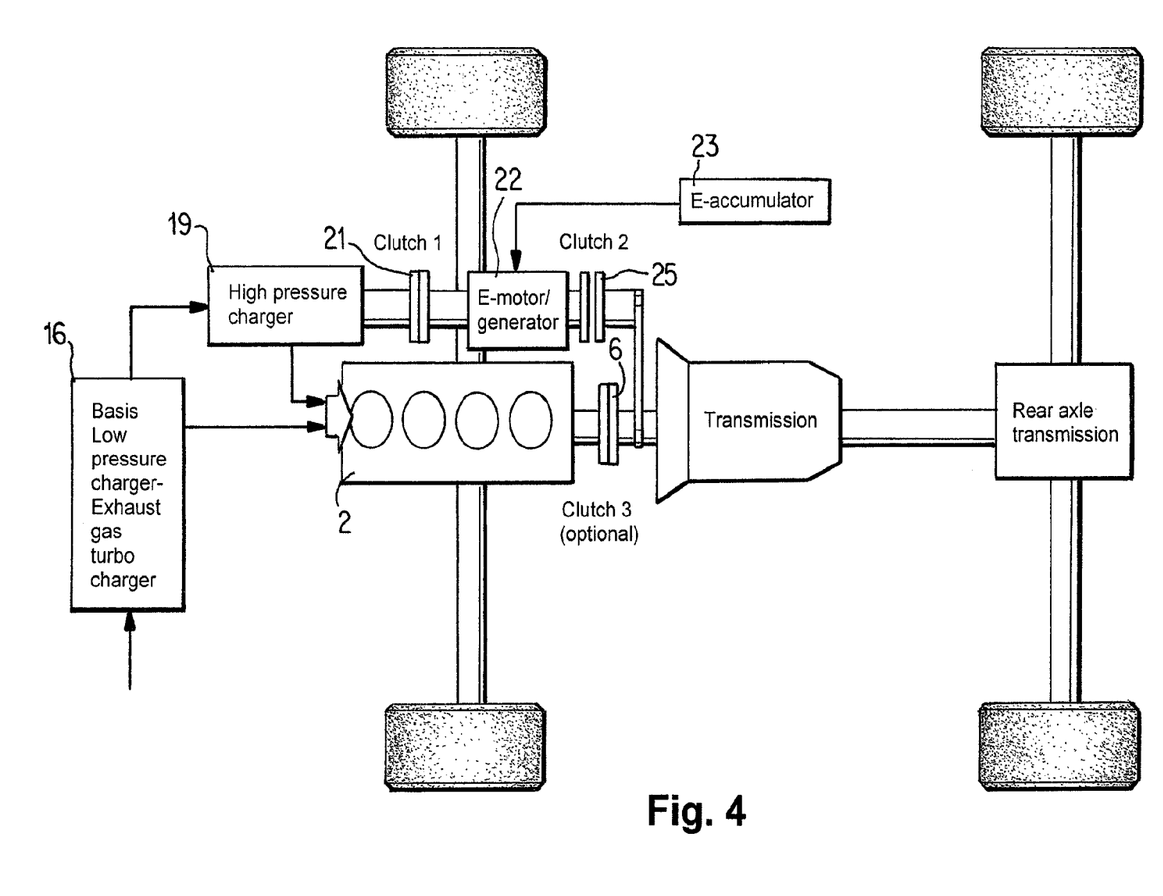
FIG. 4 is a view of the accelerated drive operating condition within the so-called low-end torque operating range.

FIG. 4 illustrates the accelerated drive operating condition at a low rotational speed and demanded high load, i.e. within the low-end torque operating range. In this operating condition, the first clutch 21 is closed; the second clutch 25 is open, and the third clutch 6 is also closed. In this operating condition, the internal-combustion engine 2 is charged in two-stages by way of the low-pressure exhaust gas turbocharger 16 and by way of the high-pressure charger 19. In this operating condition, the high-pressure charger 19 is electrically driven by the electrical machine 22 which is supplied with electric energy from the energy accumulator 23.

Figure 5:
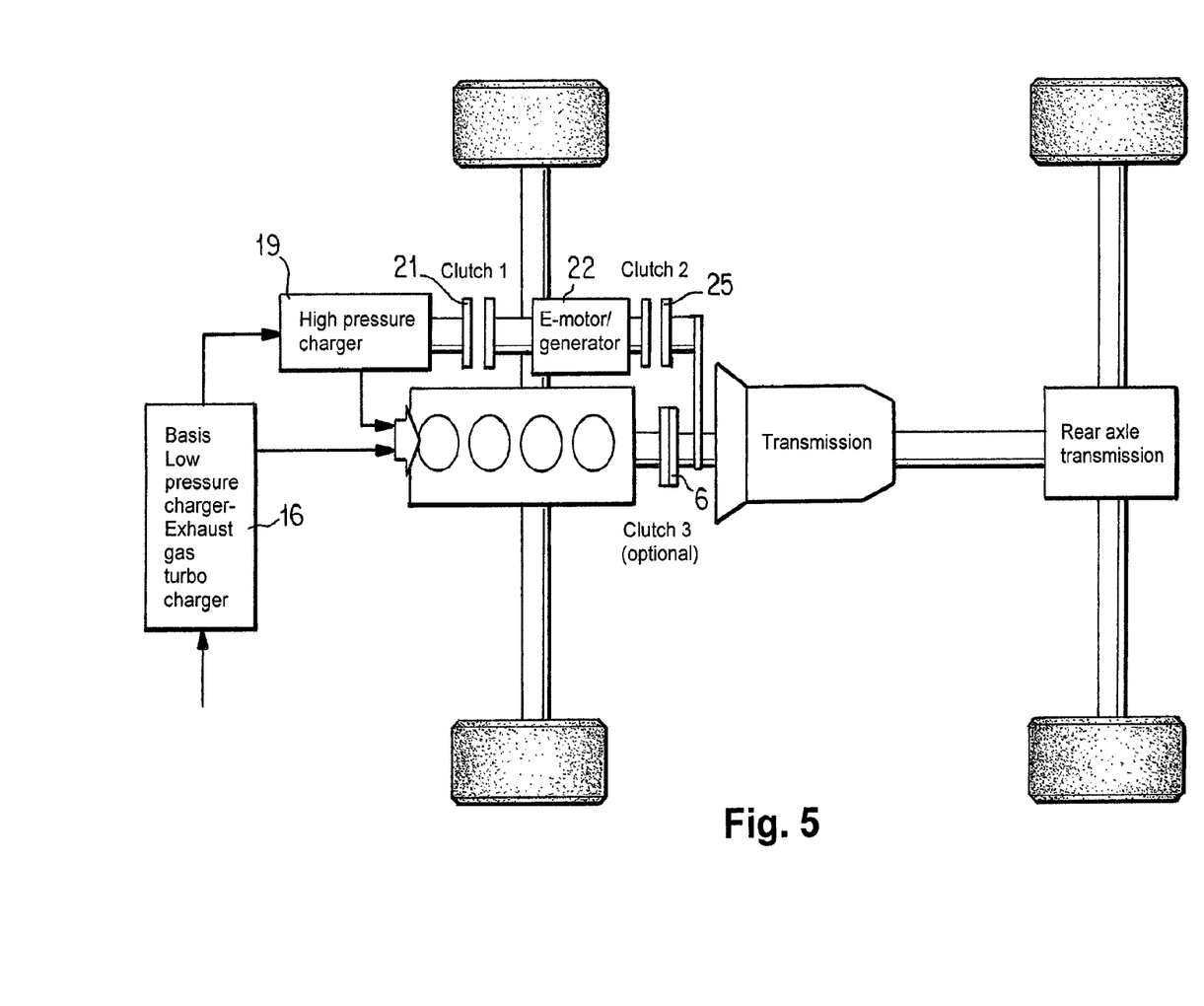
FIG. 5 is a view of the accelerated drive operating condition outside the so-called low-end torque operating range.

FIG. 5 illustrates the accelerated drive operating condition at a higher rotational speed and higher load (accelerated drive outside the low-end torque operating range). In this operating condition, the two clutches 21, 25 are open and the third clutch 6 is closed. The high-pressure charger 19 is therefore not driven by the electrical machine 22. The required charger power is provided exclusively by the low-pressure exhaust gas turbocharger 16.

Figure 6:
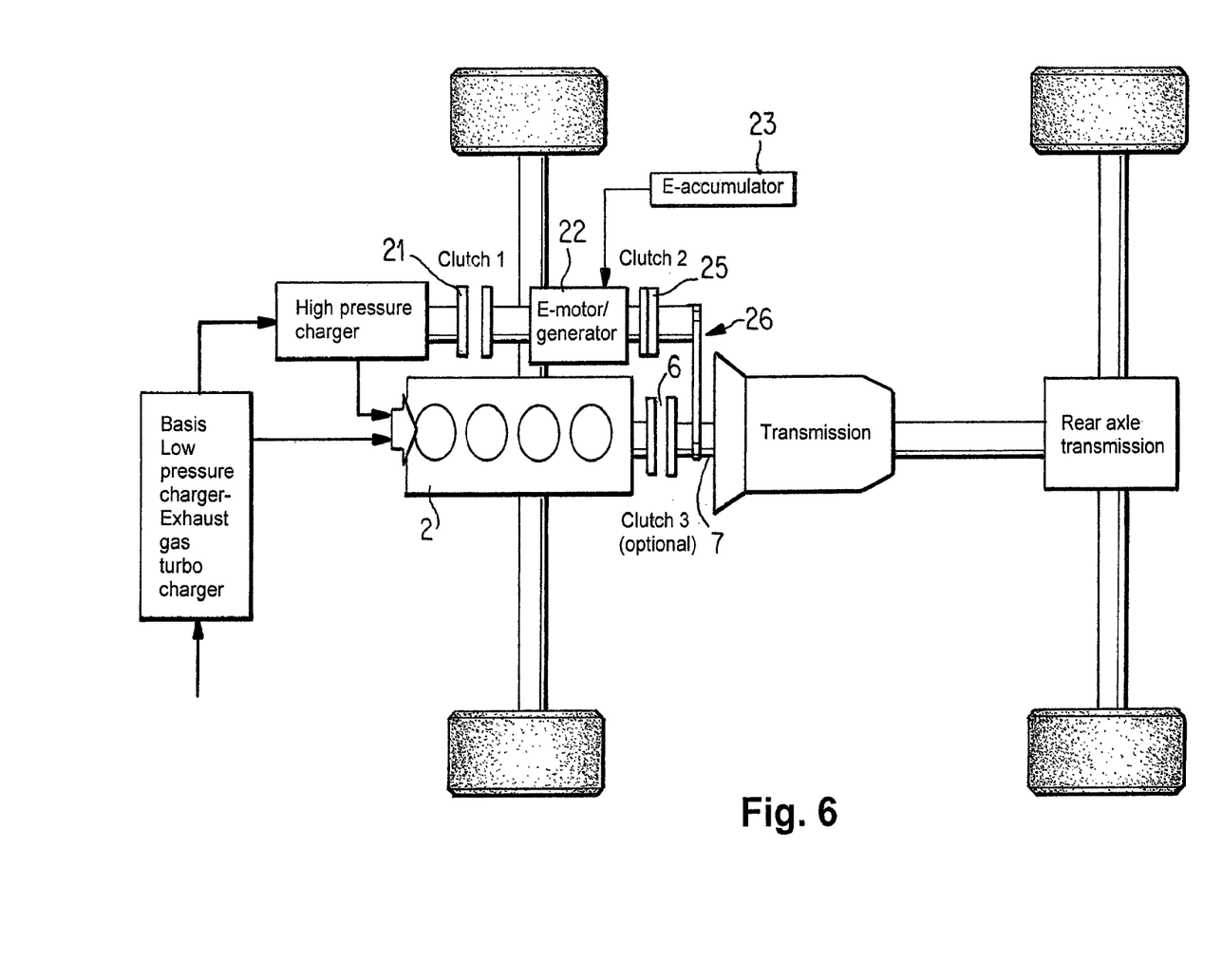
FIG. 6 is a view of the coasting drive or decelerated drive operating condition.

FIG. 6 illustrates the "recuperation" operating condition in which the clutches 21 and 6 are open and the clutch 25 is closed. The internal-combustion engine 2 is therefore uncoupled from the drive train. The power present at the transmission input shaft 7 in the coasting and braking operation respectively is fed by way of the transmission step 26 and the clutch 25 into the electrical machine 22 operating here as a generator. The generated electrical energy will then be intermediately stored in the electric accumulator 23.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   a drive train of the vehicle;
   an internal-combustion engine operatively configured for driving the drive train of the vehicle;
   at least one charger operatively configured for increasing pressure of air supplied to the internal-combustion engine;
   an electrical machine that is mechanically coupleable to the charger in a torque-transmitting manner, the electrical machine driving the charger, wherein the drive train is mechanically coupleable with the electrical machine in a torque-transmitting manner, and
   the drive train is mechanically coupleable in a torque-transmitting manner with the charger by way of the electrical machine.

2. The vehicle according to claim 1, further comprising:
   a first coupling device operatively arranged between the charger and the electrical machine, said first coupling device having an open condition and a closed condition; and
   wherein in the open condition of the first coupling device, the electrical machine is uncoupled from the charger by way of the first coupling device; and
   wherein in the closed condition of the first coupling device, the electrical machine is coupled with the charger by way of the first coupling device.

3. The vehicle according to claim 2, further comprising:
   a second coupling device operatively arranged between the drive train and the electrical machine, said second coupling device having an open condition and a closed condition; and
   wherein in the open condition of the second coupling device, the drive train is uncoupled from the electrical machine by way of the second coupling device; and
   wherein in the closed condition of the second coupling device, the drive train is coupled with the electrical machine by way of the second coupling device.

4. The vehicle according to claim 3, further comprising:
   a third coupling device by which the internal-combustion engine is coupleable with a portion of the drive train downstream of the internal-combustion engine.

5. The vehicle according to claim 4, wherein at least one of the first, second, and third coupling devices is an electromagnetic clutch.

6. The vehicle according to claim 1, further comprising:
   a second coupling device operatively arranged between the drive train and the electrical machine, said second coupling device having an open condition and a closed condition; and
   wherein in the open condition of the second coupling device, the drive train is uncoupled from the electrical machine by way of the second coupling device; and
   wherein in the closed condition of the second coupling device, the drive train is coupled with the electrical machine by way of the second coupling device.

7. The vehicle according claim 1, further comprising:
   a transmission device operatively arranged between the drive train and the electrical machine, wherein
   the transmission device comprises at least one of a chain drive, a belt drive, and at least one gear step.

8. The vehicle according to claim 1, wherein the at least one charger is a displacement charger.

9. The vehicle according to claim 1, wherein the at least one charger is an exhaust gas turbocharger.

10. The vehicle according to claim 1, wherein the at least one charger is constructed as a flow compressor.

11. The vehicle according to claim 1, further comprising:
    a first charger operatively configured to increase pressure of air supplied to the internal-combustion engine; and
    wherein said at least one charger is a second charger.

12. The vehicle according to claim 11, wherein the second charger is a high-pressure charger operatively configured to increase the pressure of intake air from a first pressure level generated by the first charger to a second, higher pressure level, and the first charger is an exhaust gas turbocharger.

13. The vehicle according to claim 12, further comprising:
    a bypass arranged in a flow direction of the intake air behind the first charger such that the second charger is bypassable by at least a portion of the intake air.

14. The vehicle according to claim 1, further comprising:
    an electric energy accumulator for storing electric energy, the electric energy accumulator being operatively arranged in an electrical connection with the electrical machine.

15. The vehicle according to claim 1, wherein
    an upstream end of the electrical machine is engageable with the at least one charger, and a downstream end of the electrical machine is engageable with a transmission.

16. A method of operating a vehicle having an internal-combustion engine that drives a drive train of the vehicle, the internal-combustion engine being acted upon by air from at least one charger, the method comprising the acts of:
    during an acceleration of the vehicle in a first operating condition, driving the charger via a mechanical connection with an electrical machine;
    during at least one of a coasting and braking operation of the vehicle in a second operating condition, mechanically coupling the electrical machine in a torque-transmitting manner with the drive train of the vehicle, wherein the electrical machine functions as a generator during at least one time increment of the second operating condition; and
    during a constant drive of the vehicle at a low rotational speed of the internal combustion engine in a third operating condition of the vehicle, mechanically coupling the charger with the drive train in a torque-transmitting manner by way of the electrical machine.

17. The method according to claim 16, further comprising the act of:
- during at least one of a constant drive and an acceleration in a fourth operating condition of the vehicle, mechanically coupling the electrical machine in a torque-transmitting manner with the drive-train of the vehicle; and
- during at least one time increment of the fourth operating condition, driving the drive train exclusively via the electrical machine or in a supporting manner via the electrical machine.

18. The method according to claim 16, further comprising:
- engaging an upstream end of the electrical machine with the at least one charger, and
- engaging a downstream end of the electrical machine with a transmission.

* * * * *